L. G. ROBLIN.
WEDGE BOLT LOCK.
APPLICATION FILED OCT. 18, 1909.

976,497.

Patented Nov. 22, 1910.
2 SHEETS—SHEET 1.

Witnesses
I. S. Edmunds
P. Prebble

Inventor
Leslie G. Roblin
By P. J. Edmunds
His Attorney

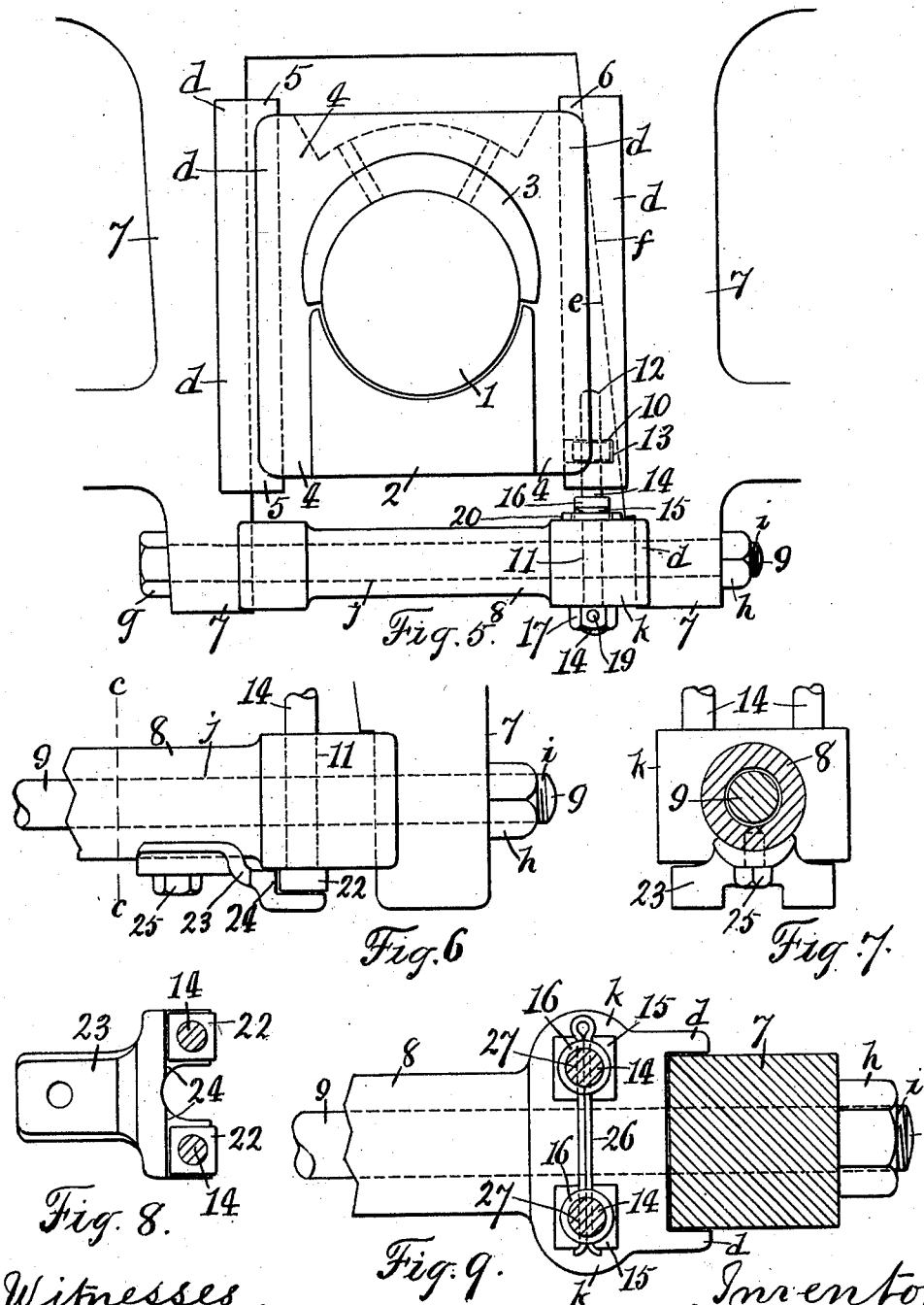

UNITED STATES PATENT OFFICE.

LESLIE G. ROBLIN, OF LONDON, ONTARIO, CANADA.

WEDGE-BOLT LOCK.

976,497.

Specification of Letters Patent. Patented Nov. 22, 1910.

Application filed October 18, 1909. Serial No. 523,373.

*To all whom it may concern:*

Be it known that I, LESLIE G. ROBLIN, a subject of the King of Great Britain, and a resident of the city of London, in the county of Middlesex, in the Province of Ontario, Canada, have invented a new, useful, and Improved Wedge-Bolt Lock, of which the following is a specification.

This invention relates to the wedge bolts of locomotives and to the holding of said bolts in place; and it consists of a collared wedge bolt and lock for the driving box wedges of locomotives, which will hold them in place or position and prevent them from working loose, and it also consists of the improved construction and novel combination of parts of the same as will be hereinafter fully set forth and described and then pointed out in the claims.

Reference being had to the accompanying drawings forming part of this specification wherein;—

Figure 1:
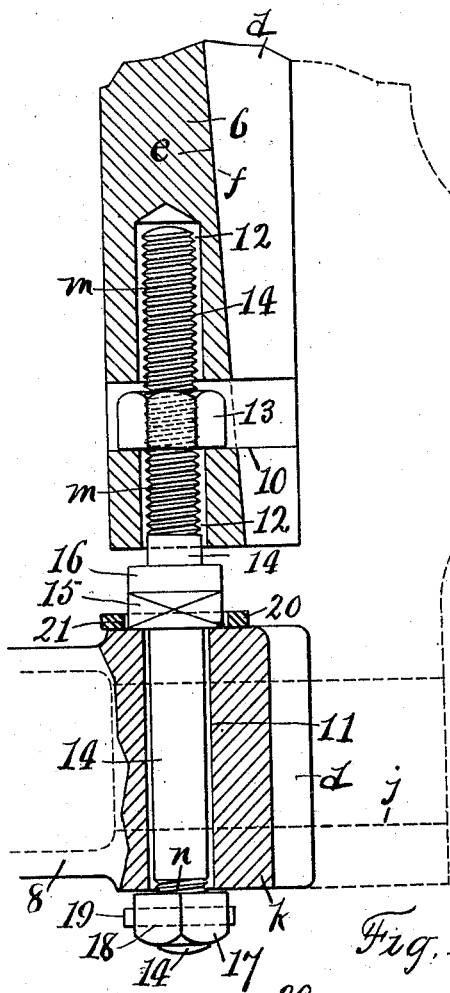
Figure 2:
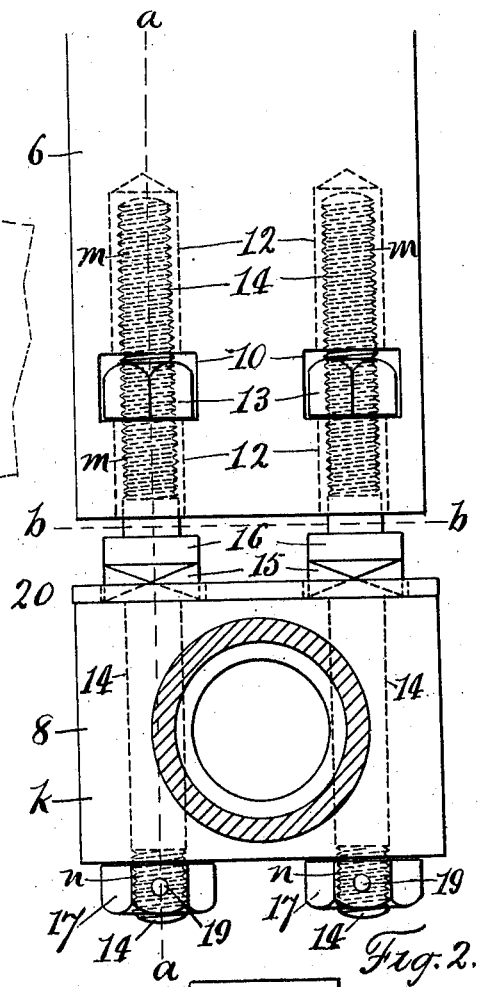
Figure 3:
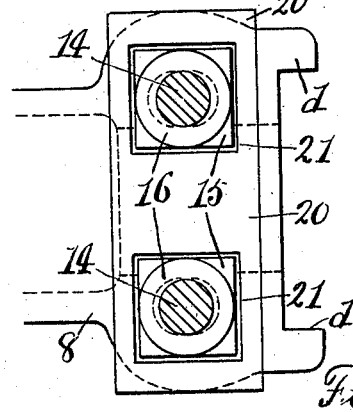
Figure 4:
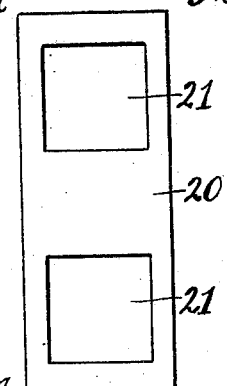

Figure 1 is a side view of a collared wedge bolt, and a sectional view on the line, $a$, $a$, of Fig. 2, of the adjacent parts of a locomotive embodying my invention. Fig. 2 is an end view of Fig. 1. Fig. 3 is a detail plan view looking downward on the line, $b$, $b$, of Fig. 2. Fig. 4 is a detail perspective view of the device which prevents the wedge bolts from working loose. Fig. 5 is a front view of a locomotive axle and supports embodying my invention. Fig. 6 is a detail side view of my invention illustrating a modification of the device which prevents the wedge bolts from working loose. Fig. 7 is a cross sectional view of same on the line $c$, $c$, of Fig. 6. Fig. 8 is a plan view of the wedge bolt lock shown in Fig. 6. Fig. 9 is another detail plan view on the line $b$, $b$, of Fig. 2, illustrating another modification of my invention which prevents wedge bolts from working loose.

In the accompanying drawings, the numeral 1 indicates the axle of the locomotive, 2 the oil cellar, 3 the brass bearing and 4 the box thereof. This box 4 has flanges $d$, which clasp the shoe 5 on one side and the wedge 6 on the other side, and said shoe 5 has similar flanges $d$, which clasp the adjacent pedestal jaw 7 on one side, and said wedge 6 has similar flanges, $d$, which clasp the adjacent pedestal jaw 7 on the other side of the axle to prevent lateral movement of the axle box 4. The wedge 6 has an inclined plane, $e$, on one side so that the flanges, $d$, of this wedge 6 are wider at the top than at the bottom, and the adjacent pedestal jaw 7 has a corresponding inclined plane, $f$, on one side as shown in Figs. 1 and 5.

8 is a pedestal brace which is fitted to and inserted between the lower portions of the pedestal jaws 7 as shown in Fig. 5; and 9 is a pedestal brace bolt provided with an enlarged head, $g$, at one end and with a nut, $h$, screwed or otherwise secured on the other screw threaded end, $i$, of said pedestal brace bolt 9. This pedestal brace bolt 9 is fitted to and inserted in a bolt hole, $j$, which extends through the pedestal jaws 7 and through the pedestal brace 8. And the pedestal brace 8 has enlarged ends, $k$, and flanges, $d$, for strength and for attachment to assist in holding the pedestal brace 8 in contact with the pedestal jaws 7.

10 indicates holes which extend horizontally through the wedge 6, and 11 indicates holes which extend vertically through the enlarged ends, $k$, of the pedestal brace 8, and 12 indicates vertical sockets in the wedge 6, in line with the holes 11.

13 indicate internal screw threaded nuts which are placed in said horizontal holes 10 of the wedge 6.

14 indicate wedge bolts provided with threads $m$, $n$, at each end, with a shouldered collar 15 and with a round collar 16, which collars 15 and 16 may be formed integral with or secured to said bolt 14 as desired.

The upper screw thread, $m$, engages with the internal screw threaded nut 13, and the lower screw threaded end, $n$, engages with the internal screw threaded nut 17; and through a pin hole 18 formed in this nut 17 and the wedge bolt 14 a pin 19 is inserted, as shown in Figs. 1, 2 and 5.

20 designates a bolt lock or device provided with the shouldered holes 21 which prevent the bolts 14 from turning.

The holes 11 in the enlarged portions, $k$, of the pedestal brace 8, are slightly elongated to prevent the wedge bolts 14 from binding on the pedestal brace 8.

In the modification shown in Fig. 6 the wedge bolt 14 has a shouldered head 22 fixed on said bolt but the lower head of said bolt 14 may be fixed or attached thereto as desired. And this head 22 in Fig. 6 is held up and prevented from turning or working loose by the device 23 provided with shoulder 24, which is held in contact with the pedestal brace 8 by the set screw 25, extending through the device 23 pedestal brace 8 and engaging with the pedestal brace bolt 9.

In the modification shown in Fig. 9, a cotter pin 26 extends through pin holes 27 formed in the wedge bolts 14 to prevent the latter from turning or working loose.

When this invention is placed in position as shown in Figs. 1, 2 and 3, the shouldered openings 21 of the lock 20 engage with the shouldered collars 15 on the wedge bolt 14, this positively prevents said wedge bolt 14 from turning or working loose. But if the wedge 6 or adjacent parts should wear slightly, which they do, all that is necessary to do is to raise the lock 20 from the shoulders 15 until it comes opposite the round collar 16, then turn the wedge bolt 14 to take up this wear, and lower the lock 20 to its original position again as shown in said figures, when this lock 20 will positively prevent the wedge bolt 14 from working loose or turning in either the wedge 6 or pedestal brace 8. The purpose of the round shoulder 16, therefore, is not only to permit the lock 20 to be raised but to prevent the wedge 6 from being lined down on the shoulder 15, which would prevent the lifting of the lock 20 above the shouldered collar 15, which is necessary to permit the turning of the bolt.

In Figs. 6, 7 and 8 side, end and top views, and in Fig. 9, a plan view of modifications of this lock 20, are shown.

In Figs. 6, 7 and 8 a shouldered head holder 23, is shown, and in Fig. 9 a cotter pin 26, is shown, which avoids and completely prevents the wedge bolt 14 from working loose or turning, and at the same time a simple, strong and durable device for this purpose is provided and one that will be not only economical to manufacture but one that will be and that has been found to be positively efficient in practical use.

Having thus described my invention, I claim:

1. A shouldered wedge bolt, in combination with a wedge bolt lock, and locking pin.

2. A wedge bolt with a collar, in combination with a lock, a locking pin and a wedge bolt head holder.

3. A wedge bolt, in combination with a wedge bolt head holder.

4. A shouldered wedge bolt, in combination with a wedge bolt lock, a locking pin and a wedge bolt head holder.

5. A wedge bolt provided with a shouldered and round collars, in combination with a wedge bolt lock, a locking pin and a wedge bolt head holder.

6. In a device of the class described, a wedge held in place by suitable means, and provided with a horizontal hole and a vertical socket, an internal screw threaded nut in said socket, and a pedestal brace provided with a vertical hole, in combination with a wedge bolt and a wedge bolt lock.

7. In a device of the class described, a wedge held in place by suitable means, and provided with a horizontal hole and a vertical socket, an internal screw threaded nut in said socket, and a pedestal brace provided with a vertical hole, in combination with a wedge bolt, a wedge bolt lock and a locking pin.

8. In a device of the class described, a wedge held in place by suitable means, and provided with a horizontal hole and a vertical socket, an internal screw threaded nut in said socket, and a pedestal brace provided with a vertical hole, in combination with a shouldered wedge bolt and a wedge bolt lock.

9. In a device of the class described, a wedge held in place by suitable means, and provided with a horizontal hole and a vertical socket, an internal screw threaded nut in said socket, and a pedestal brace provided with a vertical hole, in combination with a shouldered wedge bolt provided with a round collar, and a wedge bolt lock.

10. In a device of the class described, a wedge held in place by suitable means, and provided with a horizontal hole and a vertical socket, an internal screw threaded nut in said socket, and a pedestal brace provided with a vertical hole, in combination with a shouldered wedge bolt, a wedge bolt lock and locking pin.

11. In a device of the class described, a wedge held in place by suitable means, and provided with a horizontal hole and a vertical socket, an internal screw threaded nut in said socket, and a pedestal brace provided with a vertical hole, in combination with a shouldered wedge bolt, provided with a round collar and with a screw thread at its upper and lower ends, a wedge bolt lock a nut secured on the lower edge of said wedge bolt and a locking pin.

In testimony whereof, I have signed in the presence of the two undersigned witnesses.

LESLIE G. ROBLIN.

Witnesses:
P. J. EDMUNDS,
P. PREBBLE.